(12) United States Patent
Shoval et al.

(10) Patent No.: US 6,360,045 B1
(45) Date of Patent: Mar. 19, 2002

(54) HIGH ORDER SPATIAL MODE TRANSMISSION SYSTEM

(75) Inventors: Eduardo Shoval, Ramat Hasharon; Yochay Danziger, Rishon le Zion; Uri Levy, Rehovot, all of (IL)

(73) Assignee: LaserComm Inc., Plano, TX (US)

( * ) Notice: Subject to any disclaimer, the term of this patent is extended or adjusted under 35 U.S.C. 154(b) by 0 days.

(21) Appl. No.: 09/507,001

(22) Filed: Feb. 22, 2000

Related U.S. Application Data

(60) Provisional application No. 60/121,321, filed on Feb. 23, 1999.

(51) Int. Cl.$^7$ ................................................ G02B 6/16

(52) U.S. Cl. ........................................................ 385/123

(58) Field of Search ........................... 385/25–29, 123; 372/21, 22, 29, 92, 94, 102, 103

(56) References Cited

U.S. PATENT DOCUMENTS

| | | | | |
|---|---|---|---|---|
| 4,261,639 A | | 4/1981 | Kogelnik et al. | 350/96.15 |
| 5,185,827 A | * | 2/1993 | Poole | 385/28 |
| 5,261,016 A | | 11/1993 | Poole | 385/28 |
| 5,361,319 A | | 11/1994 | Antos et al. | 385/123 |
| 5,388,113 A | * | 2/1995 | Oka | 372/21 |
| 5,559,920 A | * | 9/1996 | Chraplyvy et al. | 385/123 |
| 5,781,673 A | | 7/1998 | Reed et al. | 385/24 |

FOREIGN PATENT DOCUMENTS

EP     0 866 574 A1     9/1998

OTHER PUBLICATIONS

Ky et al., "Efficient broadband intracore granting $LP_{01}$—$LP_{02}$ mode converters for chromatic–dispersion compensation," vol. 23, No. 6, Optics Letters, Mar. 15, 1998, pp. 445–447.

Atwood et al., "Submarine Fiber Design For 10 GB/S Transmission," Corning Incorporated delivered at the 1999 Multiplexed Telephony Conference.

* cited by examiner

*Primary Examiner*—Akm E. Ullah
(74) *Attorney, Agent, or Firm*—Kahn, Simon Mark

(57) ABSTRACT

The invention relates to methods and apparatus for transmitting an optical signal having optical energy. The system, in one embodiment, includes at least one transmission span including an optical waveguide. The transmission span transmits substantially all of the optical energy in a single high order spatial mode. The optical waveguide, in one embodiment, has a dispersion and a dispersion slope for a given transmission bandwidth. In another embodiment, the invention further relates to an optical transmission system which includes a spatial mode transformer positioned to receive an optical signal. The spatial mode transformer transform the optical energy of the optical signal from a low order spatial mode to a high order spatial mode. The system further includes an optical transmission waveguide in optical communication with a spatial mode transformer, and the optical transmission waveguide transmits substantially all of the optical energy in the high order spatial mode. Another aspect of the invention relates to a method for transmitting an optical signal having optical energy substantially in a single high order spatial mode. The method includes the steps of receiving the optical signal having optical energy in the single high order spatial mode, and transmitting the optical signal having optical energy in the single high order spatial mode through a transmission span. The transmission span includes an optical waveguide.

22 Claims, 17 Drawing Sheets

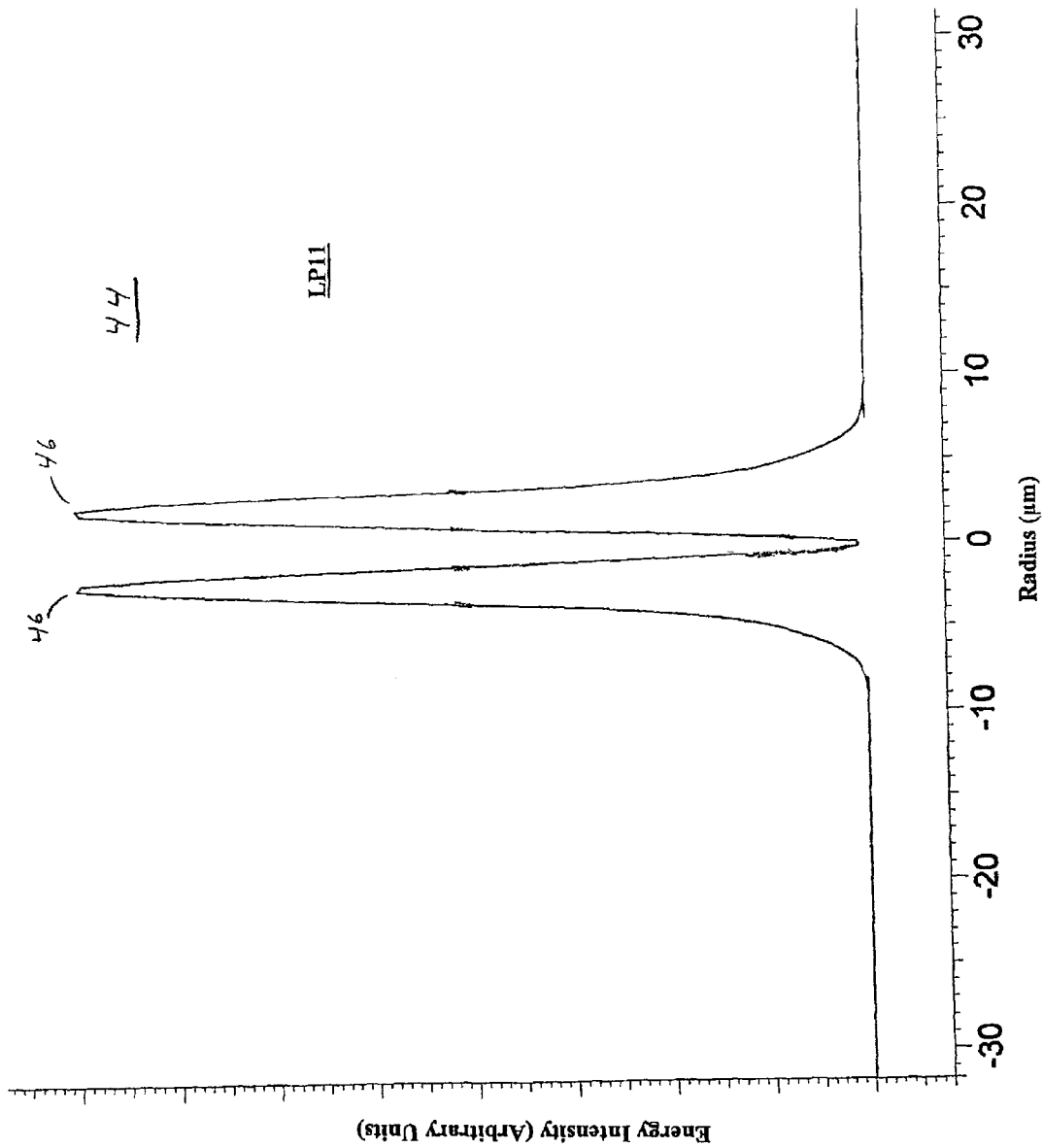

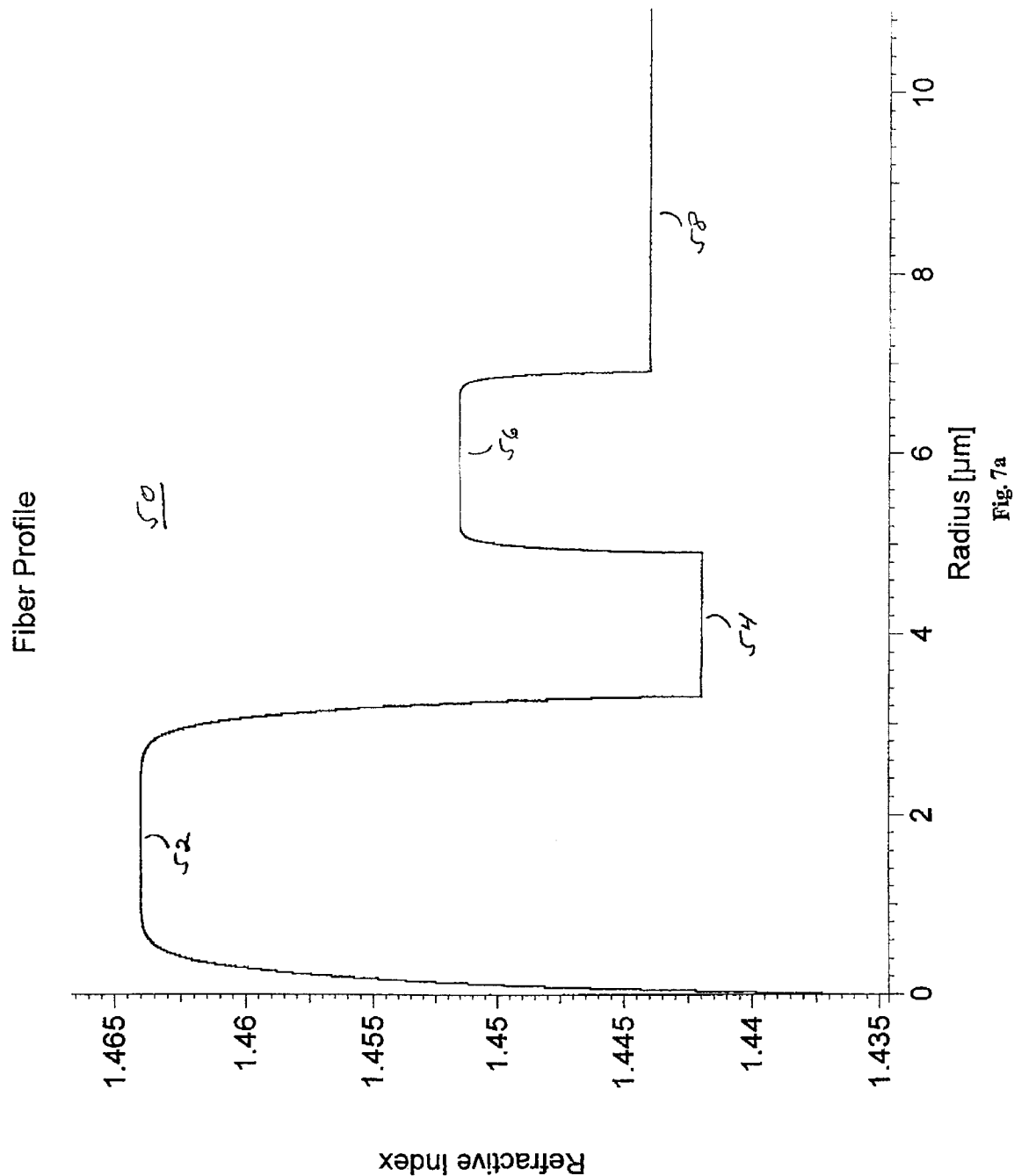

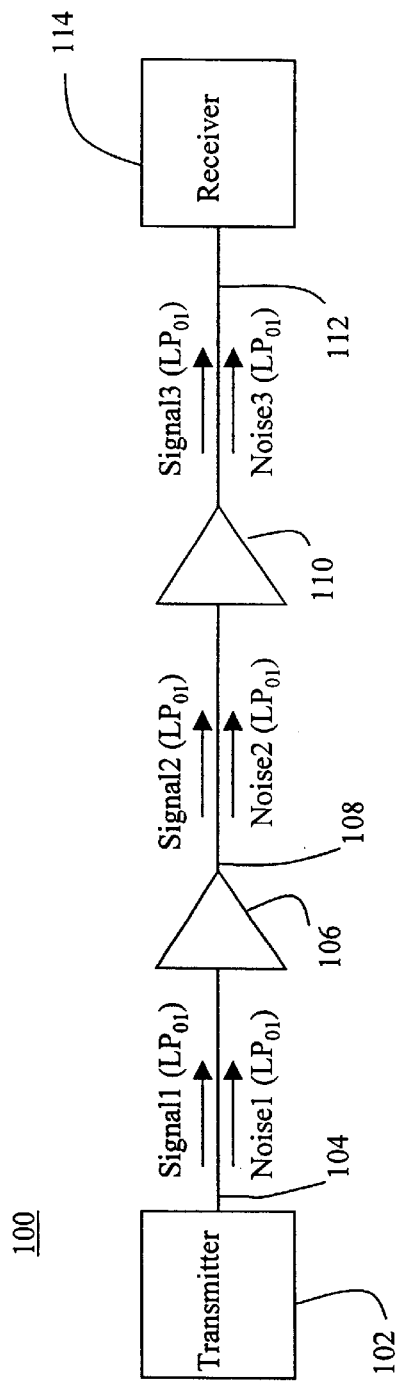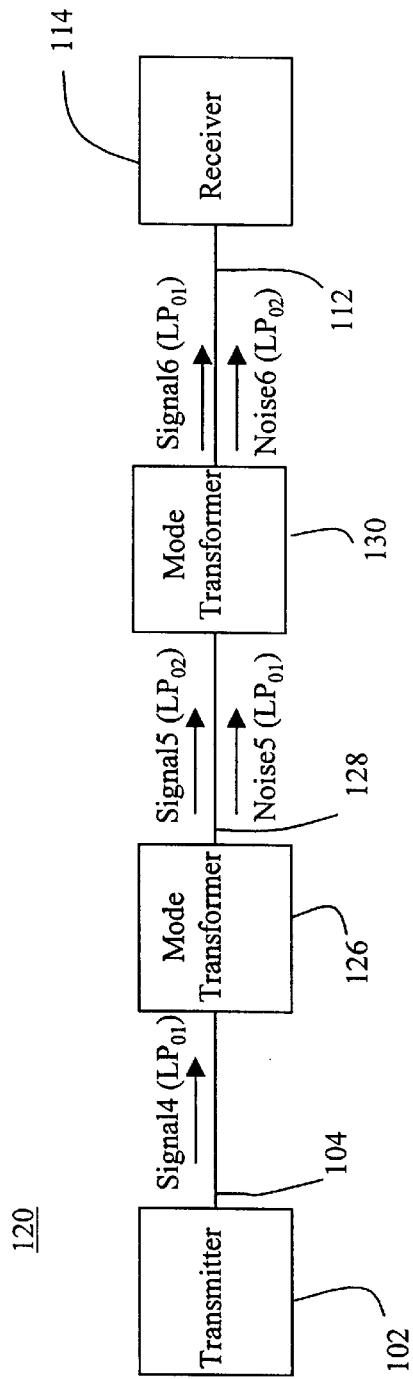
Fig. 12 (Prior Art)
Fig. 13

HIGH ORDER SPATIAL MODE TRANSMISSION SYSTEM

CROSS-REFERENCE TO RELATED APPLICATIONS

This application claims priority to provisional U.S. patent application No. 60/121,321 which was filed in the United States Patent Office on Feb. 23, 1999 and incorporates by reference U.S. patent application "High Order Spatial Mode Optical Fiber" Ser. No. 09/510,027 filed on Feb. 22, 2000 filed concurrently herewith.

FIELD OF THE INVENTION

The invention relates to optical communication systems, and more specifically to methods and apparatus for utilizing optical transmission fibers which support higher order spatial modes.

BACKGROUND OF THE INVENTION

Multimode fibers which typically support hundreds of optical modes are subject to modal dispersion. Single-mode optical fibers (SMF) which exclusively support a single optical spatial mode, namely the $LP_{01}$ spatial mode also known as the fundamental mode, are typically used today in optical communication systems. The transmission loss in these SMFs is generally minimized for wavelengths in the range of 1300 and 1550 nm typically utilized for long-distance communications. Single mode fibers are typically utilized because they exhibit virtually no signal quality degradation as a result of modal dispersion. However, as the pulses in this range propagate through an SMF, their waveforms tend to spread because of chromatic dispersion resulting in limitations on the bit rate and the transmission distance. The total chromatic dispersion experienced is a combination of material dispersion and waveguide dispersion, which may be of opposite sign. In a conventional non-dispersion shifted SMF commonly used in conjunction with the communication wavelength band of 1550 nm, the total dispersion is approximately 17 ps/nm·km. This primarily results from material dispersion.

An additional limitation in the transmission of optical signals is the existence of noise, which masks the signal. The signal-to-noise ratio (S/N) is a critical factor in allowing either lower power or longer distances for transmission. Current fiber technology does not typically address this problem, and it is instead resolved by regenerating the signal as necessary with amplification or signal conditioning, which adds expense and complexity to the system.

Dispersion slope is defined as the rate of change of the total chromatic dispersion of the fiber as the wavelength changes. In a conventional non-shifted SMF used for the communication wavelength band of 1550 nm the dispersion slope is about 0.06 ps/nm²·km. Compensating for positive dispersion by using dispersion compensating fibers which have low attenuation and high negative dispersion values is well known in the art (See, for example, U.S. Pat. Nos. 5,185,827, 5,261,016 and 5,361,319). However, compensating for negative dispersion may require long lengths of fiber (See, for example, U.S. Pat. No. 4,261,639). Most systems utilize some method of compensating for dispersion, so that the received signal is not substantially dispersed or spread. However, the use of dedicated dispersion compensating fibers adds losses to the system. In addition, compensating for the dispersion slope is quite difficult, and as a result, the channels furthest from the center channel in wave division multiplexed (WDM) systems experience residual dispersion even after compensation.

A paper entitled. "Submarine Fiber Design for 10 GB/S Transmission" delivered at the 1999 Annual Multiplexed Telephony Conference by Atwood and Adcox of Corning Incorporated, Corning, N.Y., describes a current method being utilized to compensate for dispersion without utilizing a dedicated dispersion compensating fiber. In the system described in the paper, high dispersion is desired locally throughout the system and dispersion close to zero is desired for the overall system or repeating block. Nine spans of negative dispersion fiber are used, and are compensated by a single span of positive dispersion fiber. This method is well known to those skilled in the art and is referred to as concatenation. A span is defined as the length of fiber between amplifiers, or between the transmitter or receiver and the nearest amplifier. While the dispersion is compensated at some wavelengths, the slope is not correctly compensated for and must be dealt with on an individual wavelength basis after demultiplexing. Furthermore, a single mode fiber (SMF) with negative slope typically has a small effective area ($A_{eff}$), which leads to increased undesired non-linear effects in high power systems. To solve this problem, a complicated solution is employed. The solution requires the use of a subspan of a large effective area fiber, which has a large dispersion slope at the beginning of the span for the effective length of nonlinear interactions, followed by a subspan of a different fiber profile for the balance of the span.

U.S. Pat. No. 5,781,673 describes another solution for resolving the dispersion slope by utilizing an additional span of dispersion slope compensation fiber. However, this solution adds complexity to the system, and may enhance undesirable losses as well.

Thus there is a need for a system utilizing fibers with a large effective area ($A_{eff}$) for reduced non-linear effects, minimal dispersion and dispersion slope. It is also desirable to design a fiber that is flexible enough to exhibit both positive and negative dispersion, and both positive and negative slope. There is also a need for a method to reduce noise in an optical transmission system.

SUMMARY OF THE INVENTION

The invention relates, in one embodiment, to an optical transmission system for transmitting an optical signal having optical energy. The system, in another embodiment, includes at least one transmission span including an optical waveguide. The transmission span transmits substantially all of the optical energy in a single high order spatial mode. In another embodiment, the single high order spatial mode is the $LP_{02}$ spatial mode. The optical transmission system, in yet another embodiment, further includes at least one additional transmission span. The transmission span, in another embodiment, includes an optical fiber.

The optical wave guide, in one embodiment, has a dispersion and a dispersion slope for a given transmission bandwidth. The dispersion includes at least material dispersion, and the absolute value of the dispersion is substantially between zero and the material dispersion. In another embodiment, the dispersion of the optical waveguide is negative over the transmission bandwidth. In yet another embodiment, the dispersion of the optical waveguide is positive over the transmission bandwidth. In still other embodiments, the dispersion slope of the optical waveguide is positive, negative, or nominally zero.

The invention further relates to an optical transmission system which includes a spatial mode transformer positioned to receive an optical signal. The spatial mode transformer transforms the optical energy of the optical signal from a low order spatial mode to a high order spatial mode. The system further includes an optical transmission waveguide in optical communication with a spatial mode transformer, and the optical transmission waveguide transmits substantially all of the optical energy in the high order spatial mode. In one embodiment, the high order spatial mode is the $LP_{02}$ spatial mode. In another embodiment, the low order spatial mode is the fundamental spatial mode. In yet another embodiment, the system includes a second spatial mode transformer in optical communication with the optical waveguide, and the second spatial mode transformer transforms the optical energy in the high order spatial mode to a low order spatial mode.

The invention further relates to a method for transmitting an optical signal having optical energy substantially in a single high order spatial mode. The method includes the steps of receiving the optical signal having optical energy in the single high order spatial mode, and transmitting the optical signal having optical energy in the single high order spatial mode through a transmission span. The transmission span includes an optical waveguide.

Another aspect of the invention includes a method for transmitting an optical signal having optical energy in a first spatial mode. The method includes the steps of receiving an optical signal having optical energy in the first spatial mode, transforming the optical energy in the first spatial mode to optical energy in a second spatial mode, and transmitting the optical energy in the second spatial mode through an optical transmission waveguide. In another embodiment, the method further includes the step of transforming the optical energy in the second spatial mode to optical energy in a third spatial mode. In one embodiment, the first spatial mode is the $LP_{01}$ spatial mode. In another embodiment, the second spatial mode is the $LP_{02}$ spatial mode. In yet another embodiment, the third spatial mode is the $LP_{01}$ spatial mode.

BRIEF DESCRIPTION OF THE DRAWINGS

This invention is pointed out with particularity in the appended claims. The above and further advantages of this invention may be better understood by referring to the following description taking in conjunction with the accompanying drawings, in which:

FIG. 6 illustrates the waveform of the $LP_{11}$ spatial mode for the refractive index profile shown in FIG. 1.

FIG. 7a illustrates another embodiment of a manufactured refractive index profile of a fiber constructed according to the present invention.

FIG. 7b illustrates the chromatic dispersion and dispersion slope of the refractive index profile shown in FIG. 7a.

FIG. 11b illustrates the chromatic dispersion and dispersion slope of the refractive index profile shown in FIG. 11a.

FIG. 12 illustrates a block diagram of a conventional transmission system known to the prior art.

FIG. 13 illustrates a block diagram of one embodiment of a transmission system constructed according to the present invention.

DETAILED DESCRIPTION

The present invention in one embodiment typically utilizes a few mode optical transmission waveguide. This is an optical waveguide which typically supports only a few spatial modes. In another embodiment, the waveguide is an optical fiber. The fiber design is optimized for the transmission of substantially a single higher order spatial mode. In higher order spatial modes the energy is less concentrated in a given region of the waveguide and, therefore a larger effective area ($A_{eff}$) may be achieved. Consequently, non-linear effects which are proportional to the energy concentration in the fiber will suppressed. Another advantage of using a high order spatial mode in the transmission fiber is the ability to control the chromatic dispersion and the dispersion slope of the high order spatial modes. It is a particular aspect of the present invention that fibers which support higher order spatial modes may be designed by adjusting their refractive index profile so that they will have the desired dispersion and dispersion slope. In particular, an extremely low dispersion slope, on the order of 0.02 ps/nm²·km or lower may be achieved, and fibers with either positive or negative dispersion and positive or negative dispersion slope may be designed according to one aspect of the invention. The following description specifies a higher order spatial mode being the $LP_{02}$ spatial mode, however this is not meant to be limiting in any way, and can be applied to other high order spatial modes as well, which will be apparent to those skilled in the art. The term optical transmission waveguides or transmission fiber is intended to refer to a waveguide or a fiber designed to cover a significant transmission distance for the purpose of carrying an optical signal between disparate locations, which are typically several kilometers apart.

Figure 1:
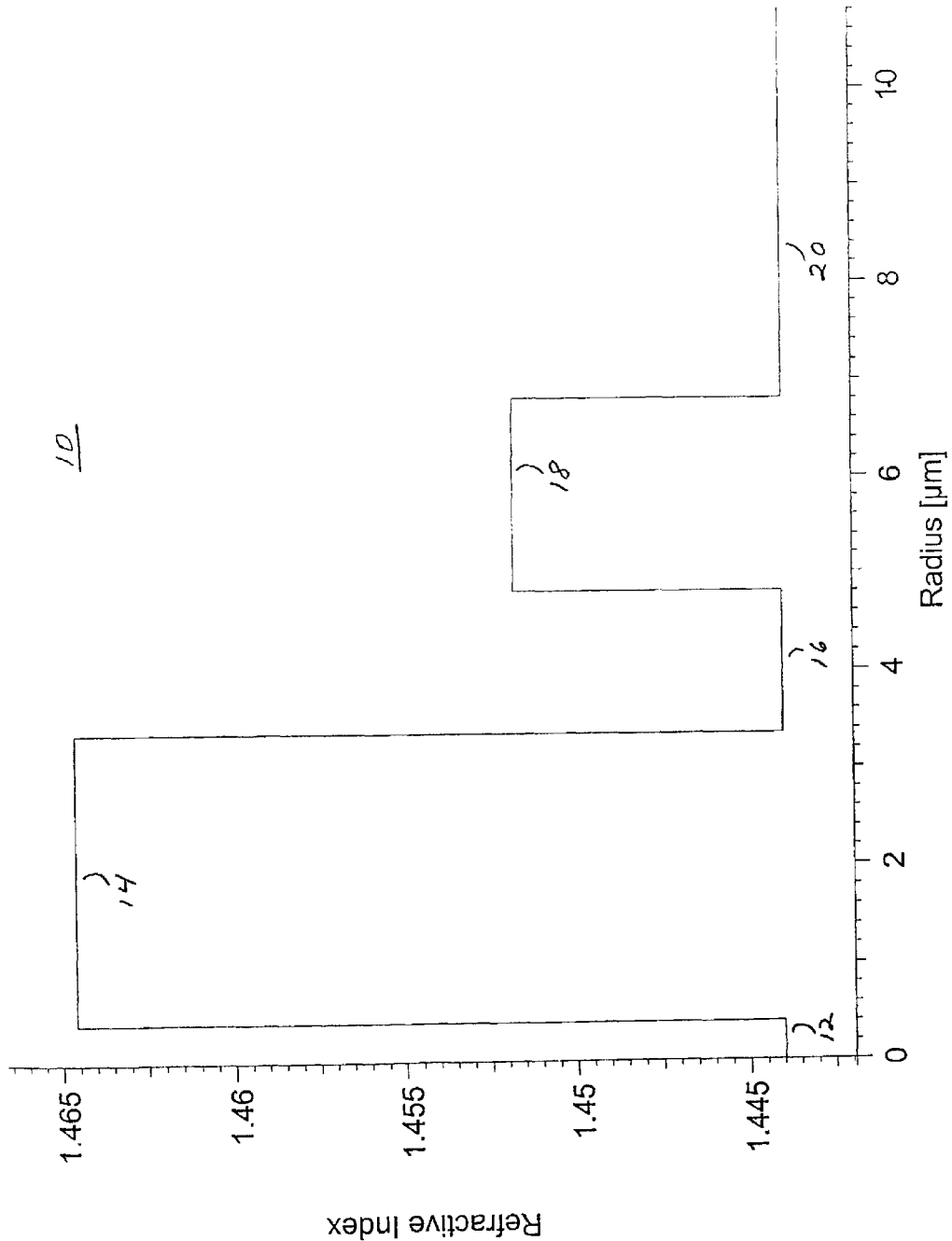
FIG. 1 illustrates an embodiment of a refractive index profile of a fiber constructed according to the present invention.

FIG. 1 illustrates one embodiment of a refractive index profile 10 according to the present invention. The area 12 at the center of the core of the fiber is an area of depressed refractive index. Minimizing the germanium dopant in area 12 of the fiber creates this depressed index. This area of depressed index 12, functions to increase the effective area ($A_{eff}$) of the fiber, and helps to differentiate the propagation constants of the spatial modes. This reduces mode coupling and the resultant Multi-Path Interference (MPI). The increased effective area ($A_{eff}$) results in reduced non-linear effects. The increase in refractive index at region 14 guides the $LP_{02}$ spatial mode, while the depression in index at region 16 controls the dispersion slope. Note that in this embodiment, the refractive index in region 12 is substantially the same as the refractive index in region 16 and the cladding region 20, although other embodiments can be designed by introducing different dopants. The refractive index increase at region 18 is allowed to vary substantially, and functions to limit the expansion of the $LP_{02}$ spatial mode into the cladding and thus to limit macrobending losses. The profile supports at least three spatial modes in the transmission bandwidth centered approximately in the region of 1550 nm, including the $LP_{01}$, $LP_{02}$, $LP_{11}$ and $LP_{21}$ spatial modes. The calculated characteristics of the fiber determined for the $LP_{02}$ spatial mode for this profile are:

$A_{eff}$ for the $LP_{02}$ spatial mode is approximately 230 $\mu m^2$.

Attenuation is about 0.2–0.4 dB/km.

Cut off for the $LP_{02}$ spatial mode is greater than 1900 nm.

Dispersion is approximately 3.7 ps/nm·km at 1550 nm.

Dispersion slope is approximately 0.0216 ps/nm²·km.

Dispersion zero is adjustable between 1450 to 1520 mn.

The calculated macrobending loss is acceptable with an $n_{eff}$ of 1.4454 for the $LP_{02}$ spatial mode.

Figure 2:
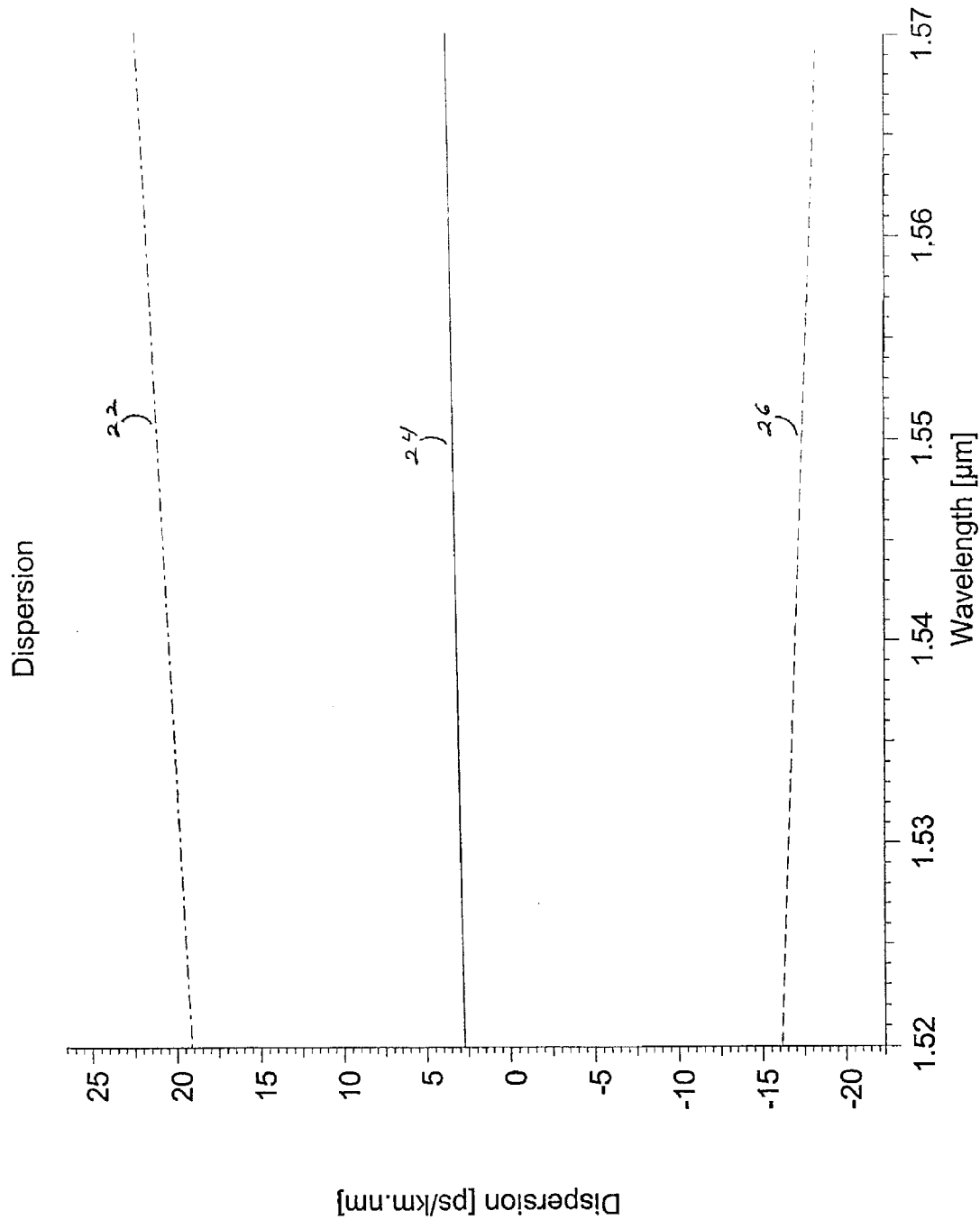
FIG. 2 illustrates the chromatic dispersion and dispersion slope of the refractive index profile shown in FIG. 1.

FIG. 2 illustrates the total chromatic dispersion and dispersion slope of the refractive index profile 10 shown in FIG. 1 for a signal in the $LP_{02}$ spatial mode. The total chromatic dispersion 24 is the sum of the material dispersion 22 and the waveguide dispersion 26. By adjusting the refractive index profile of fiber, the waveguide dispersion 26 can be modified so as to arrive at the desired dispersion slope and zero dispersion point. A unique feature of the fiber profile 10 of FIG. 1 is the extremely low slope of the total chromatic dispersion 24, which is approximately 0.02 ps/nm²·km.

Figure 3:
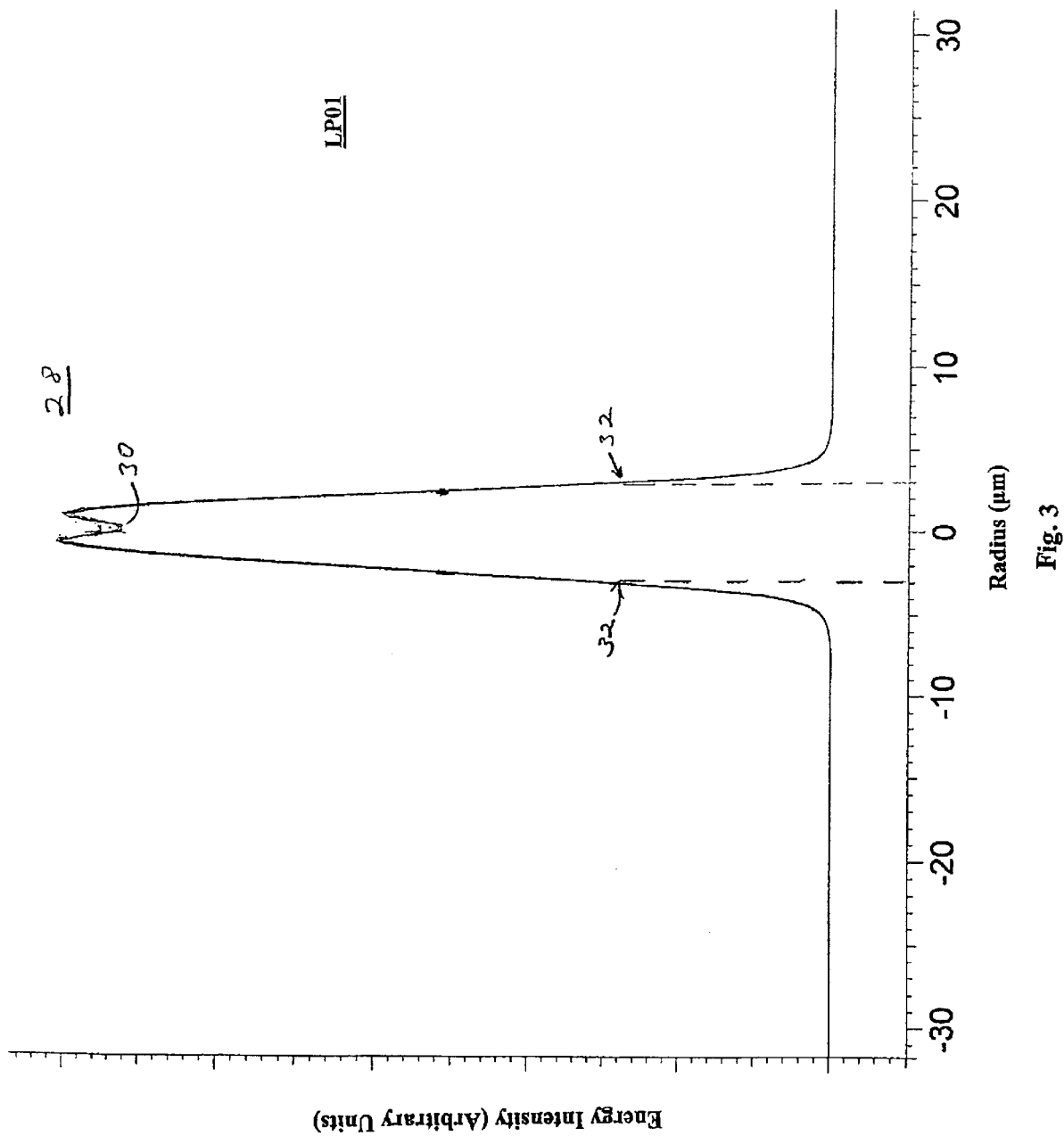
FIG. 3 illustrates the waveform of the $LP_{01}$ spatial mode for the refractive index profile shown in FIG. 1.

FIG. 3 illustrates the waveform 28 for the $LP_{01}$ spatial mode in the refractive index profile 10 of FIG. 1. The X-axis represents radius in microns from the core center, and the Y-axis represents the energy intensity in arbitrary units. Due to the depression 12 in the fiber profile, a depressed area 30 appears in the waveform, which serves to spread the energy away from the center of the core. Region 32 indicates the energy intensity at a point approximately 3 82 m from the core center.

Figure 4:
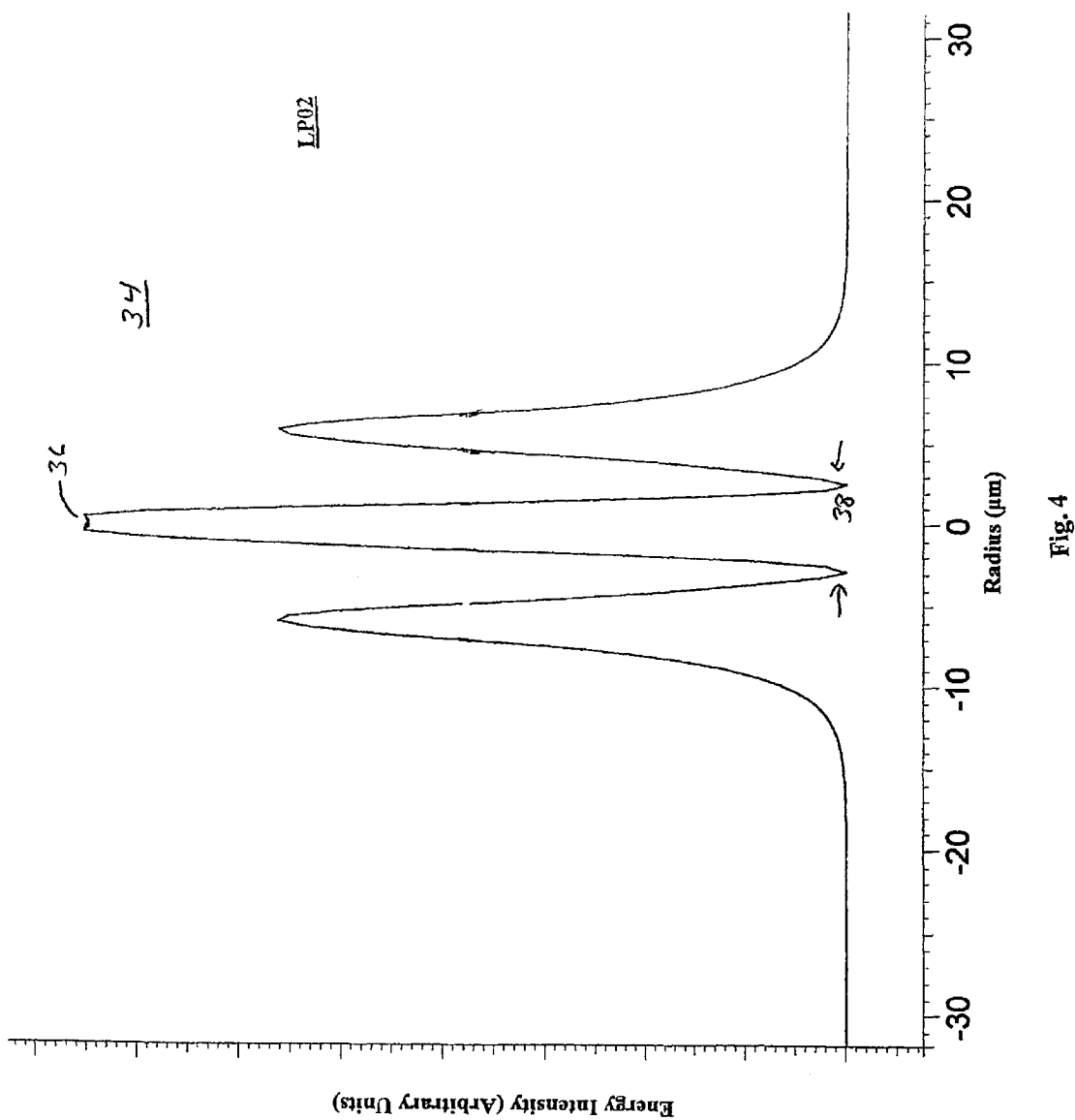
FIG. 4 illustrates the waveform of the $LP_{02}$ spatial mode for the refractive index profile shown in FIG. 1.

FIG. 4 illustrates the waveform 34 for the $LP_{02}$ spatial mode in the refractive index profile 10 of FIG. 1, using the same axes as FIG. 3. Depression 12 in the fiber profile (FIG. 1) forms well 36 in the waveform of the $LP_{02}$ spatial mode which is minimal in comparison to well 30 of the waveform for the $LP_{01}$ spatial mode shown in FIG. 3. The $LP_{02}$ spatial mode has minimal energy at point 38, approximately 31 $\mu m$ from the core center. Note that region 38 of the $LP_{02}$ spatial mode corresponds to region 32 of the $LP_{01}$ spatial mode shown in FIG. 3. Thus at the point where the $LP_{02}$ spatial mode has minimal energy, the $LP_{01}$ spatial mode contains significant energy. It should also be noted by comparing waveform 34 with fiber profile 10 of FIG. 1, that the modal energy is substantially contained within the core area 14 and area 18 of increased refractive index.

Figure 5:
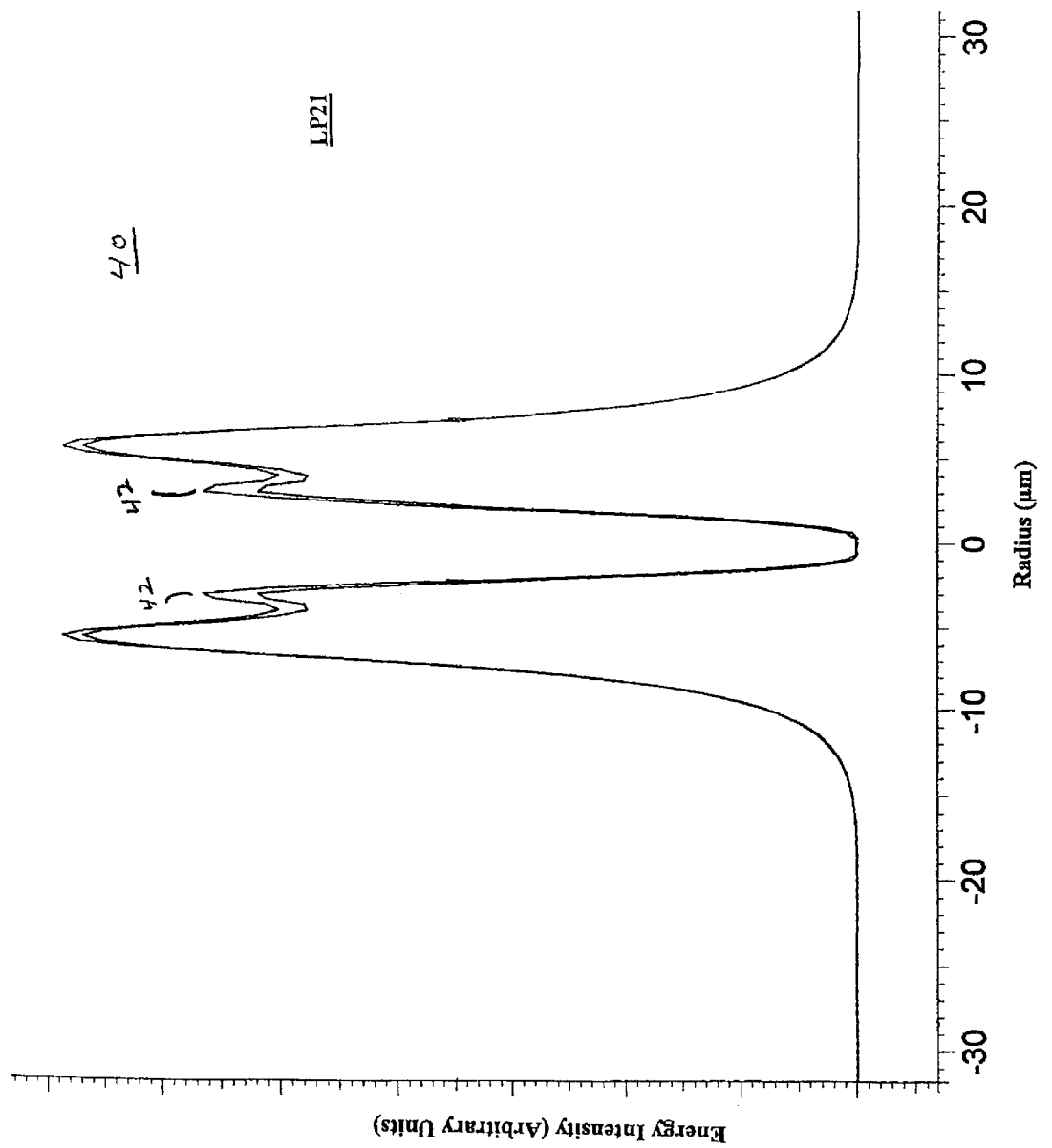
FIG. 5 illustrates the waveform of the $LP_{21}$ spatial mode for the refractive index profile shown in FIG. 1.

FIG. 5 illustrates the waveform 40 for the $LP_{21}$ spatial mode in the refractive index profile 10 of FIG. 1, utilizing the same axes as FIG. 3. It is to be noted that a point of high intensity occurs at a radius designated as 42, which corresponds closely with the minimal energy point of waveform 34 shown in FIG. 4. Thus at the point where the $LP_{02}$ spatial mode has minimal energy the $LP_{21}$ spatial mode contains significant energy.

FIG. 6 illustrates the waveform 44 for the $LP_{11}$ spatial mode in the refractive index profile 10 of FIG. 1, utilizing the same axes as FIG. 3. It is to be noted that the maximum intensity occurs at a radius designated as 46, which corresponds closely with the minimal energy point of waveform 34 shown in FIG. 4. Thus at the point where the $LP_{02}$ spatial mode has minimal energy the $LP_{11}$ spatial mode contains significant energy.

U.S. patent applications Ser. No. 09/464,629 filed Dec. 17, 1999 now U.S. Pat. No. 6,327,403 and Ser. No. 09/481, 428 filed Jan. 12, 2000, is being allowed which claim priority to provisional U.S. patent application No. 60/138, 369 filed on Jun. 10, 1999 describe methods for attenuating undesired modes in an optical waveguide. The minimum energy points of waveform 34, designated 38 of FIG. 4, may be used in connection with the method described in the aforementioned applications to attenuate undesired modes in the inventive fiber profile. A further method known to the art for removing higher order modes other than the desired high order mode involves curving a length of the waveguide to a smaller radius. Higher order modes will then escape from the cladding. The radius of the curvature is chosen to be small enough to attenuate higher order modes, but to maintain the desired high order mode. This procedure may, in one embodiment, be utilized in defining the radius of a dispersion compensation fiber reel.

FIG. 7a illustrates a fiber profile similar to that of FIG. 1 without the core dip 12, and with the smoother transitions generally seen in actual fabrication. The fiber is designed with a single central core area 52 which is used to guide the $LP_{02}$ spatial mode, while the depression in index at region 54 is used to control the dispersion slope. The dip near the core center is primarily a result of the manufacturing process and is not caused by a planned dopant. Note that in this embodiment, the refractive index in region 54 is less than that of the cladding 58, although other embodiments can have different refractive index profile designs. Changing the height and width of regions 52, 54 and 56 will substantially alter the resultant characteristics of the fiber. The increase in refractive index at region 56 functions to limit the expansion of the $LP_{02}$ spatial mode into the cladding. The characteristics are similar to the characteristics of fiber profile 10, with an $A_{eff}$ of 270 $\mu m^2$, but with increased mode coupling.

Figure 7B:
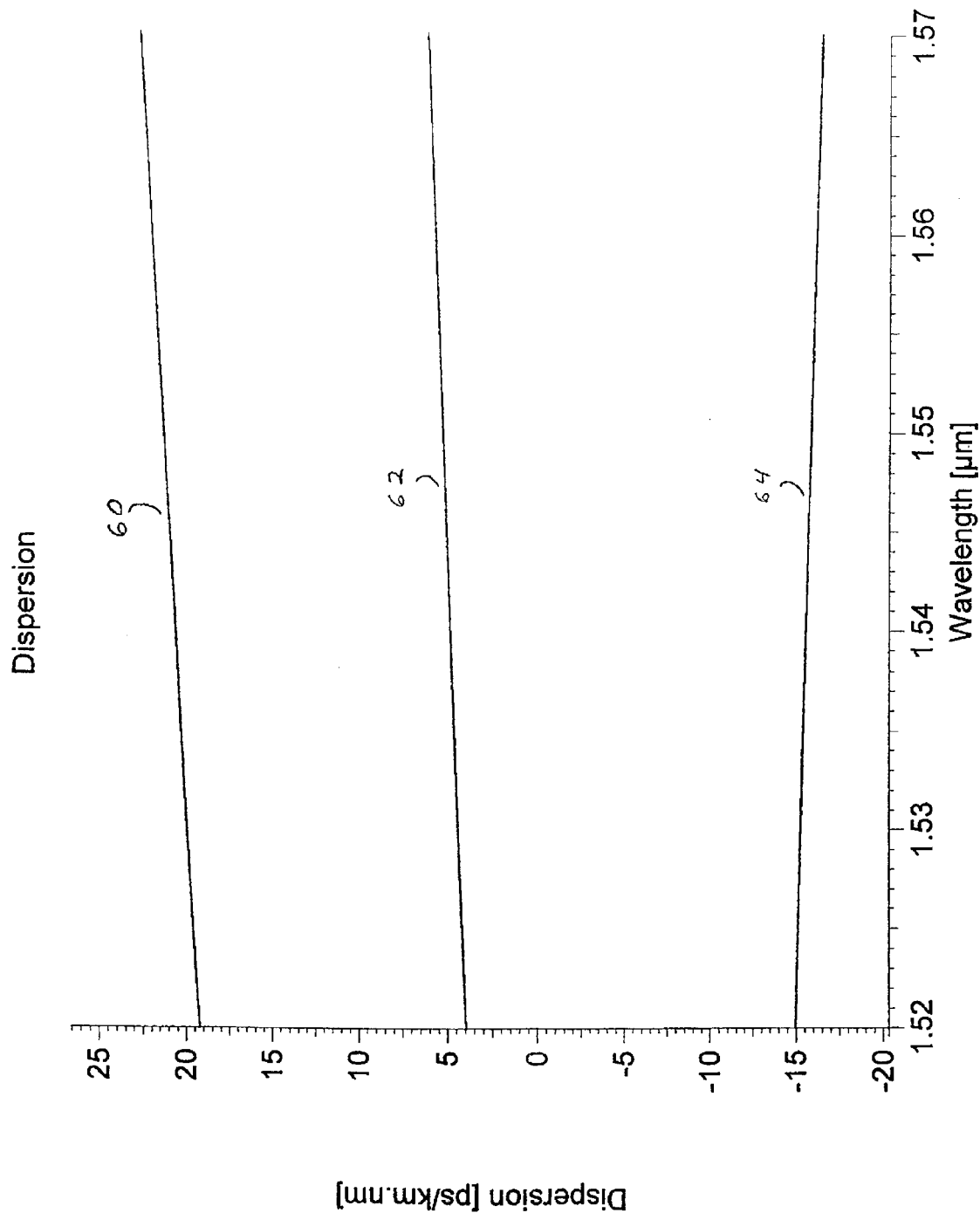

FIG. 7b illustrates the total chromatic dispersion and dispersion slope of the refractive index profile 50 shown in FIG. 7a for a signal in the $LP_{02}$ spatial mode. The total chromatic dispersion 62 is the sum of the material dispersion 60 and the waveguide dispersion 64. By adjusting the refractive index profile of fiber, the waveguide dispersion can be modified so as to arrive at the desired dispersion slope and zero dispersion point. A unique feature of the fiber profile 50 of FIG. 7a is the low slope of the total chromatic dispersion 62, which is approximately 0.042 ps/nm²·km, with a dispersion at 1550 nm of 5.2 ps/nm·km.

Figure 8:
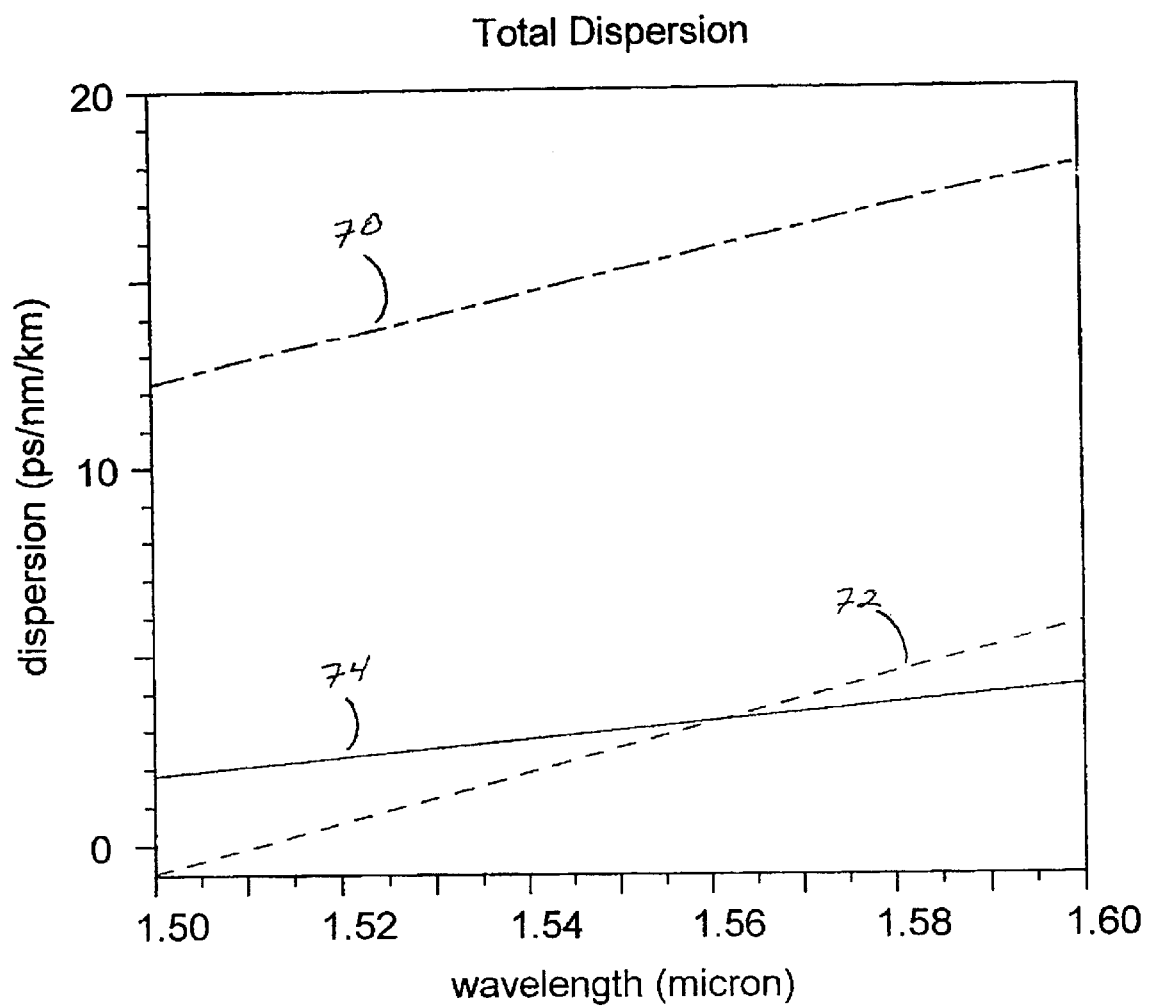
FIG. 8 illustrates the total dispersion for three different fibers including an embodiment of a fiber constructed according to the present invention.

FIG. 8 illustrates the total dispersion for three different fibers including a fiber manufactured according to the present invention. Line 70 represents a typical single mode fiber such as SMF-28™ produced by Corning Incorporated, Corning, N.Y. Such a fiber, typically has a dispersion of between about 12 ps/nm·km to about 18 ps/nm·km depending on wavelength. For example, at approximately 1550 nm this fiber can achieve a dispersion of 17 ps/nm·km, which means that when an optical pulse having a spectral width of 1 nm propagates in 1 km of this fiber, the pulse broadens by about 17 ps. The slope of line 70 is quite large indicating that different wavelengths will experience significantly different chromatic dispersion. Line 72 is a single mode fiber (SMF) with low dispersion, from approximately 2.0 to 6.0 ps/nm·km (SMF3) and has a relatively large effective area ($A_{eff}$). The LEAF™ fiber by Corning Incorporated, Corning, N.Y., has such a profile. This fiber is similar to the SMF-28™ fiber in that it suffers from a somewhat large dispersion slope as well; on the order of 0.07–0.1 ps/nm²·km. Line 74 represents a high order mode transmission optical fiber (THOM) according to the present invention. The present fiber exhibits relatively low dispersion on the order of between 2 and 4 ps/nm/km across a broad wavelength range and an extremely low dispersion slope of approximately 0.02 ps/nm²·km.

Figure 9:
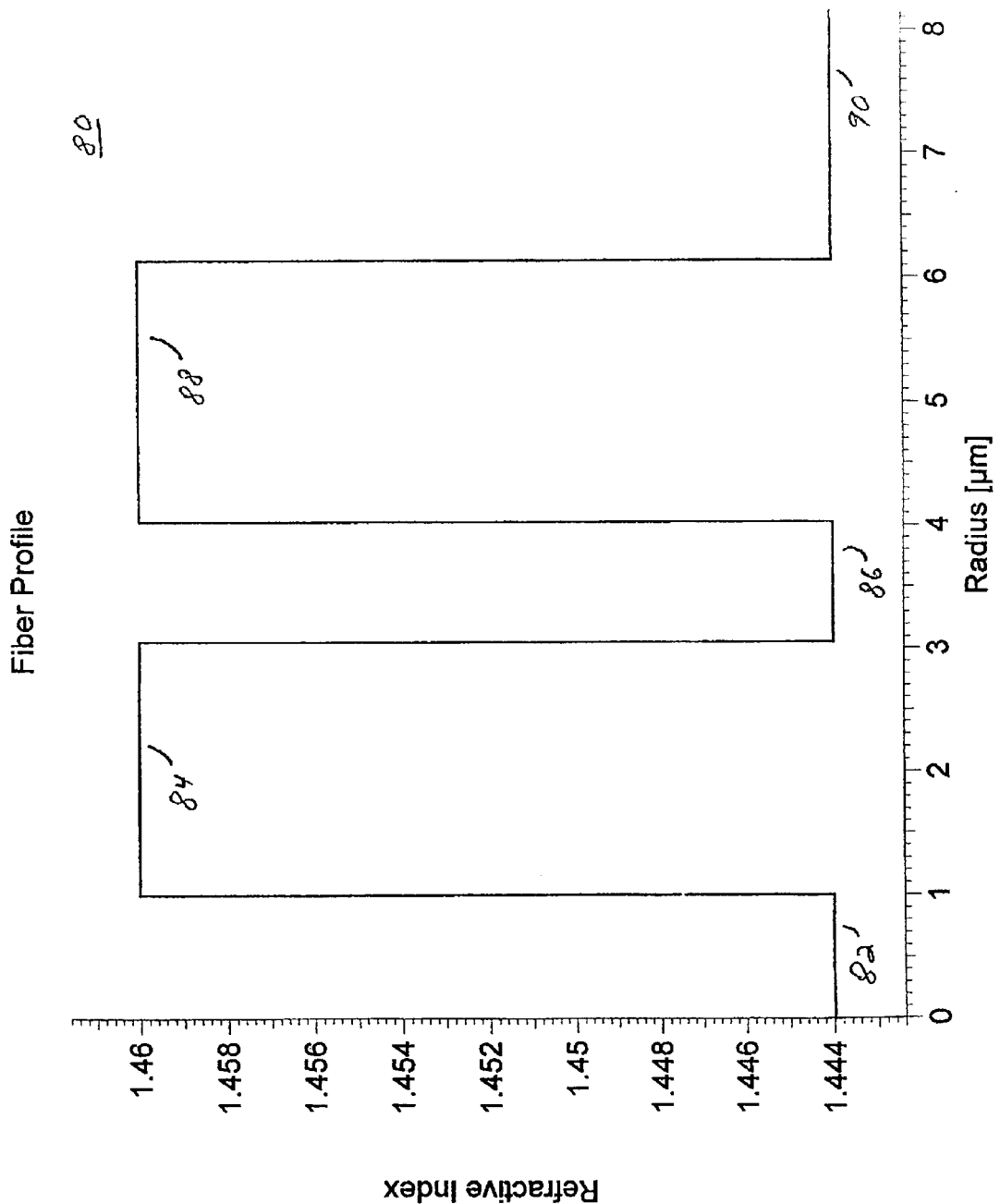
FIG. 9 illustrates another embodiment of a refractive index profile of a fiber constructed according to the present invention.

FIG. 9 illustrates another embodiment of a refractive index profile 80 of a fiber constructed according to the present invention. The area 82 at the center of the core of the fiber is an area of depressed index. Minimizing the germanium dopant in area 82 creates this depressed refractive index. As with the fiber shown in FIG. 1, this area of depressed index 82, functions to increase the effective area ($A_{eff}$) of the fiber, and helps to differentiate the propagation constants of the spatial modes, and thus reduce ode coupling and the resultant multi-path interference (MPI). The increased effective area ($A_{eff}$) translates to reduced non-linear effects. The increase in refractive index at region 84 to 1.4605 is used to guide the $LP_{02}$ spatial mode, while the depression in index at region 86 is used to control the dispersion slope. Note that in this embodiment the refractive index in region 82 is substantially the same as the refractive index in region 86, and the cladding region 90, although other embodiments can be designed in which they are not substantially the same. The refractive index at region 88 functions to limit the expansion of the $LP_{02}$ spatial mode into the cladding. The profile supports between three and six spatial modes in the transmission bandwidth of approximately 1520 to 1570 nm, including the $LP_{01}$, $LP_{02}$, $LP_{11}$ and $LP_{21}$ spatial modes. The calculated characteristics for this profile are:

$A_{eff}$ for the $LP_{02}$ spatial mode is approximately 94 $\mu m^2$.

Attenuation is about 0.2–0.4 dB/km.

Cut off for the $LP_{02}$ spatial mode is greater than 1900 nm.

Dispersion is approximately −2.6 ps/nm·km at 1550 nm.

Dispersion slope is approximately −0.07 ps/nm²·km.

Dispersion zero is adjustable between 1470 to 1515 nm.

The calculated banding loss is acceptable with a calculated $n_{eff}$ of 1.4469 for the $LP_{02}$ spatial mode.

Figure 10:
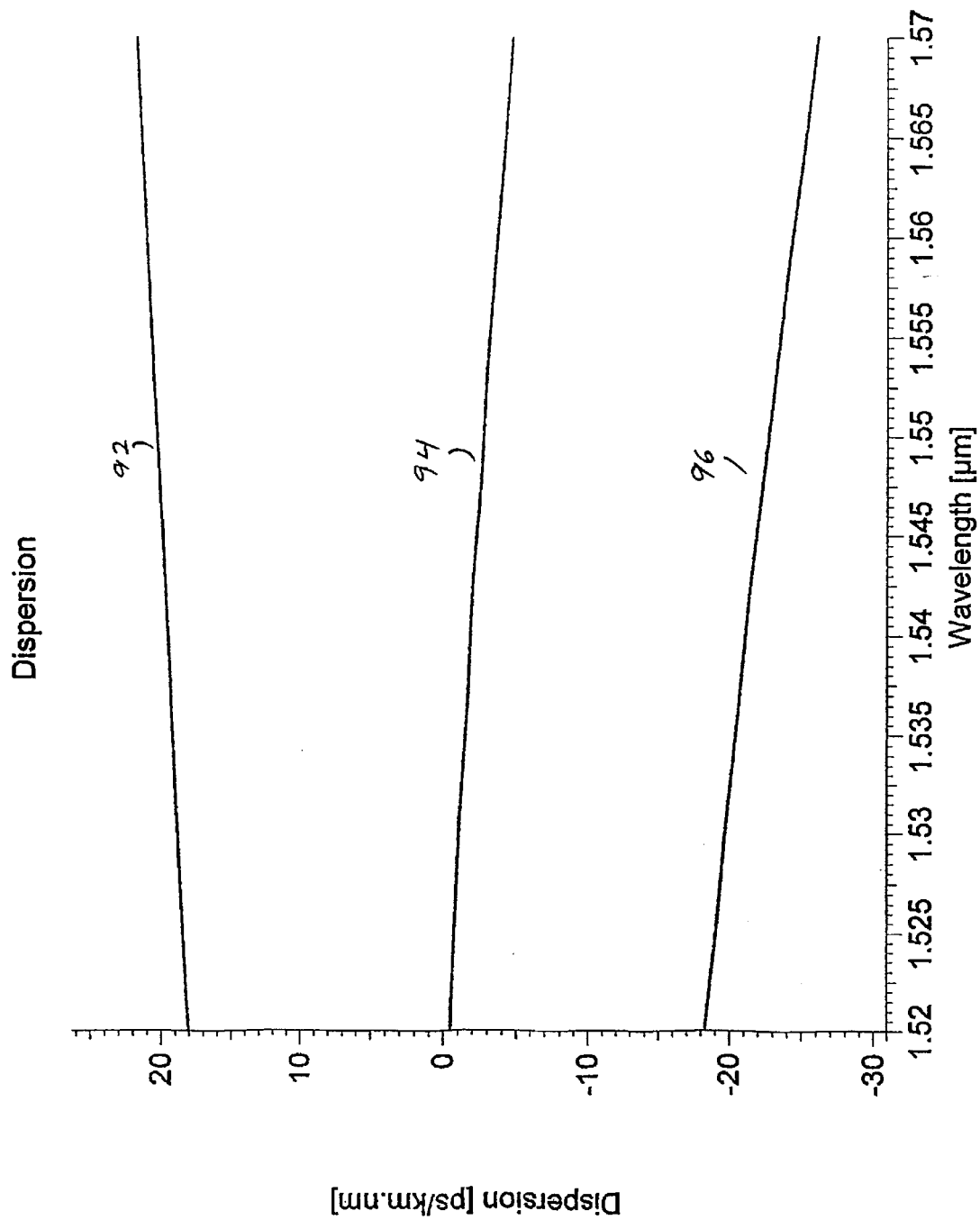
FIG. 10 illustrates the chromatic dispersion and dispersion slope of the refractive index profile shown in FIG. 9.
Figure 11A:
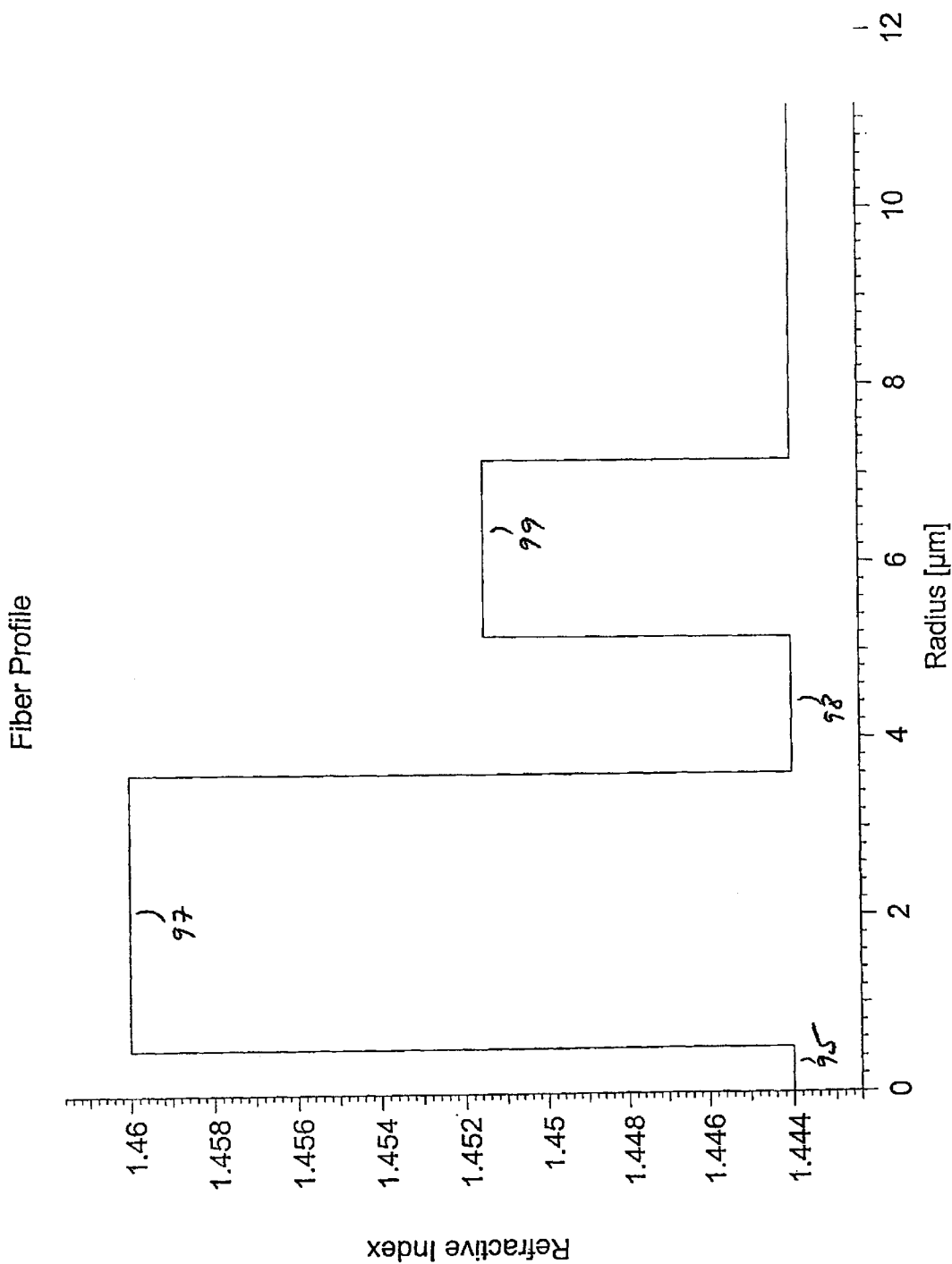
FIG. 11a illustrates another embodiment of a refractive index profile of a fiber constructed according to the present invention.

FIG. 10 illustrates the total chromatic dispersion and dispersion slope f the refractive index profile 30 shown in FIG. 9 for a signal in the $LP_{02}$ spatial mode. The total chromatic dispersion 94 is the sum of the material dispersion 92 and the waveguide dispersion 96. By adjusting the refractive index profile of fiber, the waveguide dispersion can be modified so as to arrive at the desired dispersion slope and zero dispersion point. A unique feature of the fiber profile 80 of FIG. 9 is the negative slope of the total chromatic dispersion 94, which is approximately −0.07 ps/nm²·km. It should be appreciated that by adjusting the zero dispersion point, a positive or negative dispersion can be experienced over the transmission wavelength. As previously discussed in relation to FIG. 7a, depression 82, in one embodiment, can be manipulated or dispensed with entirely causing some loss of effective area ($A_{eff}$), and increased mode coupling FIG. 11a illustrates another fiber profile which exhibits extremely low dispersion slope, with a characteristic bending loss of 1.4452. The area 95 represents a dip at the center which acts to increase the effective area ($A_{eff}$) and to reduce multi-path interference (MPI). Area 97 of the fiber profile is an area of increased refractive index of approximately 1.460. The decrease in refractive index at region 98 is used to guide the $LP_{02}$ spatial mode, while the rise in index at region 99 functions to limit the expansion of the $LP_{02}$ spatial mode into the cladding. A unique feature of the fiber profile of FIG. 11a is the effective area ($A_{eff}$) for the $LP_{02}$ spatial mode is 260 $\mu m^2$, with a dispersion at 1550 nm of 4.35 ps/nm·km and a negligible slope of 0.00007 ps/nm²·km. The fiber profile exhibits an $n_{eff}$ of 1.4452.

Figure 11B:
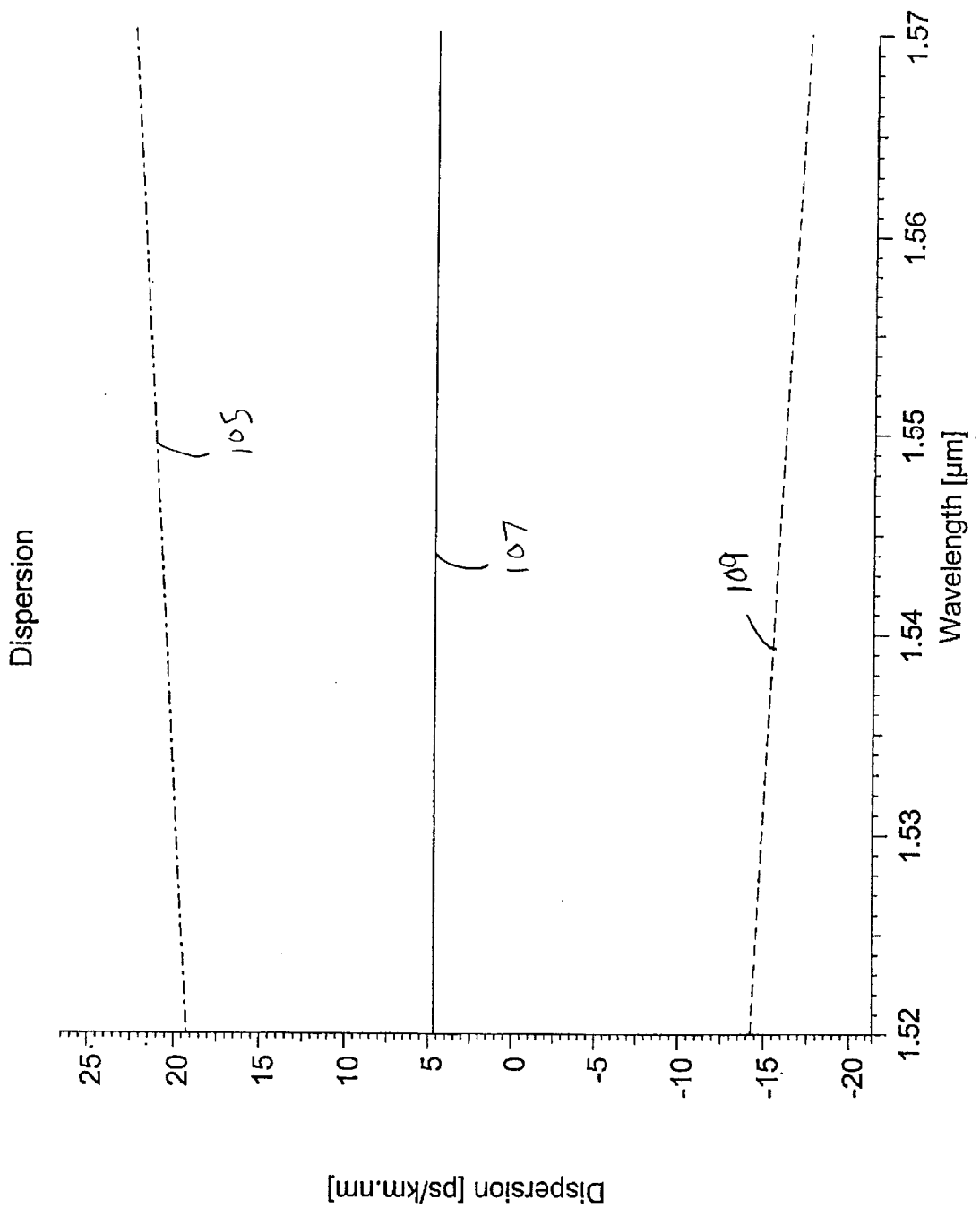

FIG. 11b illustrates the total chromatic dispersion and dispersion slope of the refractive index profile shown in FIG. 11a for a signal in the $LP_{02}$ spatial mode. The total chromatic dispersion 107 is the sum of the material dispersion 105 and the waveguide dispersion 109. By adjusting the refractive index profile of fiber, the waveguide dispersion can be modified so as to arrive at the desired dispersion slope and zero dispersion point. A unique feature of the fiber profile of FIG. 11a is the low slope of the total chromatic dispersion 107, which is approximately 0.00007 ps/nm²·km, with a dispersion at 1550 nm of 4.35 ps/nm·km.

Based on the foregoing, a fiber with the desired characteristics of dispersion, dispersion slope and effective area ($A_{eff}$), may be designed by utilizing a few rode fiber with appropriate characteristics for a desired specific higher order spatial mode, such as the $LP_{02}$ spatial mode. While four sample profiles have been shown, it is understood that one skilled in the art could produce a large range of profiles having the desired characteristics based on the principles of the invention. Suitable fibers with positive dispersion or negative dispersion, positive dispersion slope and negative dispersion slope may all be designed for higher order spatial modes without departing from the spirit and scope of the invention.

Another advantage in utilizing higher order spatial modes is an increase in the signal-to-noise ratio (S/N) which may be achieved due to the spatial distribution of the noise in the fiber. Some of the noise in the fiber is generated in a different spatial distribution than that of the signal. For example, some of the non-linear noise generated by a signal propagating in the $LP_{02}$ spatial mode is distributed in the $LP_{01}$ spatial mode. As a result, this noise has a physical property that differentiates it from the signal. This property can be used to filter the noise out of the signal.

Transforming the high order spatial mode ($LP_{02}$) of the signal into a lower order or fundamental spatial mode ($LP_{01}$), and simultaneously transforming any lower order spatial mode energy to a high order spatial mode, has the effect of filtering out this noise, when the transformed signal is subsequently carried through a single mode fiber (SMF). This is because any noise which was in the lower order spatial mode is transformed into a higher order spatial mode (higher than the new spatial mode of the signal) and this higher order spatial mode is not supported by the subsequent single mode fiber (SMF). However, only part of the noise is filtered out in this process and the non-linear noise generated in the same spatial mode as the signal, and other noise components remain. This reduction in the overall noise improves the signal-to-noise ratio, thereby enabling higher transmission capacity or increased bit rate.

FIG. 12 illustrates a block diagram of a conventional transmission system 100 known to the prior art. Transmitter 102 is coupled to a span of single-mode fiber (SMF) 104, and SMF 104 is coupled to the input of amplifier 106. The output of amplifier 106 is coupled to SMF 108, and SMF 108 is coupled to the input of amplifier 110. The output of amplifier 110 is coupled to SMF 112, and SMF 112 is coupled to receiver 114. Signal1 propagates in SMF 104 and Noise1 is generated during propagation of the signal. As it propagates, the signal intensity is attenuated making it necessary to re-amplify the signal. The distance which the signal can propagate before requiring re-amplification is a function of the initial signal intensity, the attenuation of the fiber and other factors such as total chromatic distortion. SMF 104 is coupled to Amplifier1 (106), which amplifies Signal1. However, Amplifier1 (106) amplifies Noise1 as well. Signal2, which is the amplified Signal1, propagates through SMF 108 along with Noise2. Noise2 is the amplified Noise1 and additional noise generated during propagation. Signal2 and Noise2 are then amplified by Amplifier2 (110), whose output is coupled to SMF 112. Signal3 and Noise3 then propagate in SMF 112 to Receiver 114.

FIG. 13 illustrates a block diagram of one embodiment of a transmission system 120 according to the pre;sent invention. Transmitter 102 is coupled to SMF 104 and to an input of spatial mode transformer 126, and an output of spatial mode transformer 126 is connected to transmission high order mode fiber (THOM) 128. THOM 128 is coupled to an input of spatial mode, transformer 130, and an output of spatial mode transformer 130 is coupled to SMF 112, which is coupled to receiver 114. Transmitter 102 transmits Signal4 into transformer 126, which may be connected directly to transmitter 102 (not shown), or connected to it by SMF 104 as shown. Transformer 126, which may be of a type described in pending U.S. application Ser. No. 09/248,969 filed on Feb. 12, 1999, converts substantially all of the light to a single higher order spatial mode, such as the $LP_{02}$ spatial mode. The output of transformer 126, containing Signal5 primarily in the $LP_{02}$ spatial mode and Noise5 which designates the noise component existing in the $LP_{01}$ spatial mode, propagate into the transmission high-order mode fiber (THOM) 128 of the invention. In another embodiment (not shown), transmitter 102 may be designed to output the signal directly in the desired high order spatial mode, and thus may be directly coupled to (THOM) 12. The fiber is optimized to support the $LP_{02}$ spatial mode, and during transmission, noise is generated, some of which is generated in the $LP_{01}$ spatial mode. This noise is designated Noise5. THOM 128 which is designed according to an embodiment of the current invention, contains a large effective area ($A_{eff}$) for signals in the $LP_{02}$ spatial modes, and thus can support a higher intensity signal without experiencing non-linear effects. This allows the propagation distance of Signal5 to be substantially greater before re-amplification is necessary. Note that Noise5 is propagating with Signal5. THOM 128 is coupled to spatial mode transformer 130, which, in one embodiment, is a spatial mode transformer which transforms both the $LP_{01}$ spatial mode to the $LP_{02}$ spatial mode, as well as any noise in the $LP_{01}$ spatial mode to the $LP_{02}$ spatial mode. Spatial mode transformer 130 converts substantially all of Signal5 from the $LP_{02}$ spatial mode to the fundamental $LP_{01}$ spatial mode for transmission into SMF 112 as Signal6, while simultaneously converting any noise which was received in the $LP_{01}$ spatial mode to a higher order spatial mode as Noise6. Signal6 and Noise6 propagate into SMF 112 which is designed to support only the $LP_{01}$ spatial mode, thus attenuating Noise6. SMF 112 is connected to receiver 114 which will receive Signal6 with reduced noise due to the absence of noise component Noise6, although other noise components (not shown) exist. In another embodiment (not shown), transformer 130 may be designed to attenuate or block any energy received in the $LP_{01}$ spatial mode, and transformer 130 may output its signal directly to receiver 114 without requiring SMF 112 (not shown).

Figure 14:
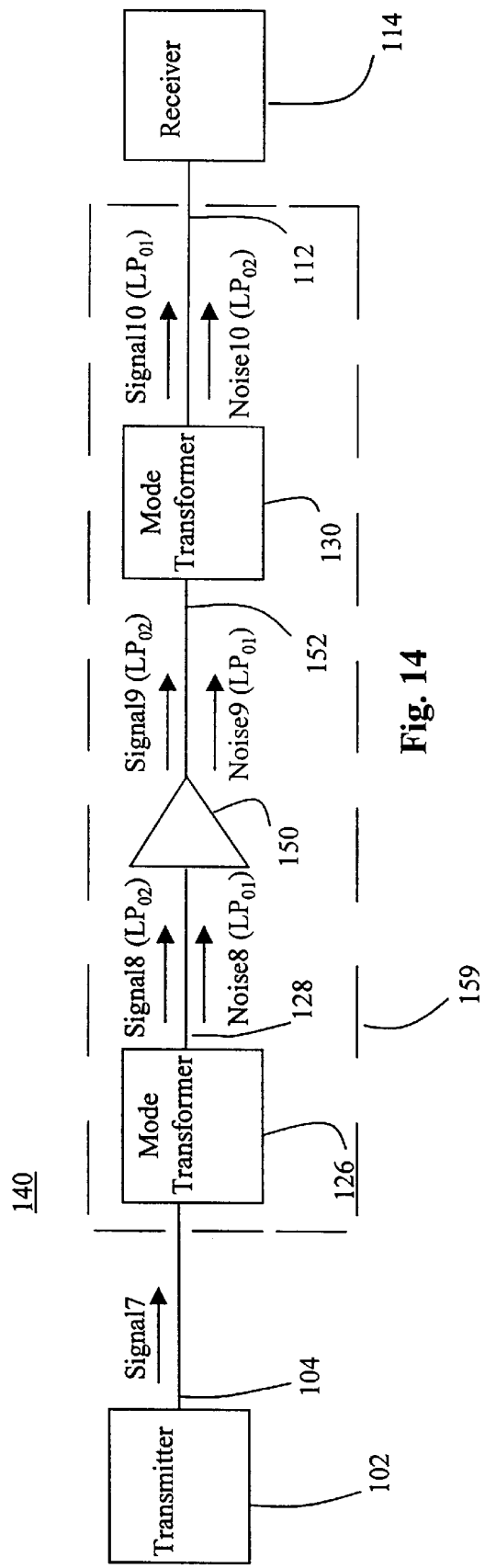
FIG. 14 illustrates a block diagram of another embodiment of a transmission system constructed according to the present invention.

FIG. 14 illustrates a block diagram of another embodiment of a transmission system 140 according to the present invention. Transmitter 102 is coupled to SMF 104, and SMF 104 is coupled to an input of spatial mode transformer 126. An output of spatial mode transformer 126 is coupled to THOM 128, and THOM 128 is coupled to the input of amplifier 150. The output of amplifier 150 is coupled to THOM 152, and THOM 152 is coupled to an input of spatial mode transformer 130. An output of spatial mode transformer 130 is connected to SMF 112, and SMF 112 is connected to receiver 114. Transmitter 102 injects a high intensity signal, designated as Signal7 into SMF 104 which is connected to spatial mode transformer 126. In an alternative embodiment (not shown), transmitter 102 may be directly connected to spatial mode transformer 126. In another alternative embodiment (not shown), transmitter 102 may be designed to output its signal directly in the desired high order spatial mode, and thus transmitter 102 may be directly connected to THOM 128. The output of spatial mode transformer 126 which, as described above, converts substantially all of the signal to a single high order mode, is connected to THOM 128. THOM 128 transmits Signal8 in the $LP_{02}$ spatial mode as well as noise, some of which is in the $LP_{01}$ spatial mode and is designated as Noise8. THOM 128 is connected to amplifier 150, which may be an Erbium Doped Fiber Amplifier (EDFA) that is designed to support the $LP_{02}$ spatial mode. In an alternative embodiment (not shown), amplifier 150 may contain a standard EDFA which only supports the $LP_{01}$ spatial mode, a spatial mode transformer at the input stage, and a spatial mode transformer at the output stage. In this embodiment, the signal can be converted to the fundamental spatial mode for amplification and then back to the higher order spatial mode prior to propagating into THOM 152. Amplifier 150 may be a single or multiple stage amplifier, and may contain dispersion compensation, and/or add/drop components. The amplified signal may be a high intensity signal due to the large effective area ($A_{eff}$) of THOM 152. The amplified signal designated Signal9 is in the $LP_{02}$ spatial mode, and contains amplified Noise9 which is substantially in the $LP_{01}$ spatial mode. These propagate in THOM 152. Additional noise propagating in the $LP_{01}$ spatial mode may be experienced while propagating in THOM 152, and is included in Noise9. It is to be understood that other noise components exist which are not exclusively in the $LP_{01}$ spatial mode, and are thus not included in the designation Noise9. THOM 152 is connected to spatial mode transformer 130, which simultaneously transforms both the $LP_{02}$ spatial mode of Signal9 to the $LP_{01}$ spatial mode, and the $LP_{01}$ spatial mode of Noise9 to the $LP_{02}$ spatial mode. Spatial mode transformer 130 converts substantially all of Signal9 from the $LP_{02}$ spatial mode to the fundamental $LP_{01}$ spatial mode for transmission into SMF 112, while simultaneously converting Noise9 which was received in the $LP_{01}$ spatial mode to a higher order spatial mode. Signal10 and Noise10 propagate into SMF 112 which is designed to support only the $LP_{01}$ spatial mode, thus attenuating Noise10. SMF 112 is connected to receiver 114 which receives Signal10 with reduced noise due to the absence of noise component Noise10. In another embodiment, spatial mode transformer 130 may be designed to attenuate or block any energy received in the $LP_{01}$ spatial mode (not shown), and transformer 130 may output its signal directly to receiver 114 without requiring SMF 112 (not shown). In another embodiment, the total chromatic dispersion of THOM 152 may be designed to counterbalance the total chromatic dispersion experienced by the signal in THOM 128, such that the system 140 experiences minimal total dispersion without a dedicated dispersion compensating fiber. In another embodiment, the length of SMF 112 may be chosen so as to compensate for the dispersion introduced by THOM 128 and THOM 152. Dashed line 159 indicates the repeating block that may be utilized to build a larger and more complex system, where the end of SMF 112 may be connected to another repeating block at input to spatial mode transformer 126.

Figure 15:
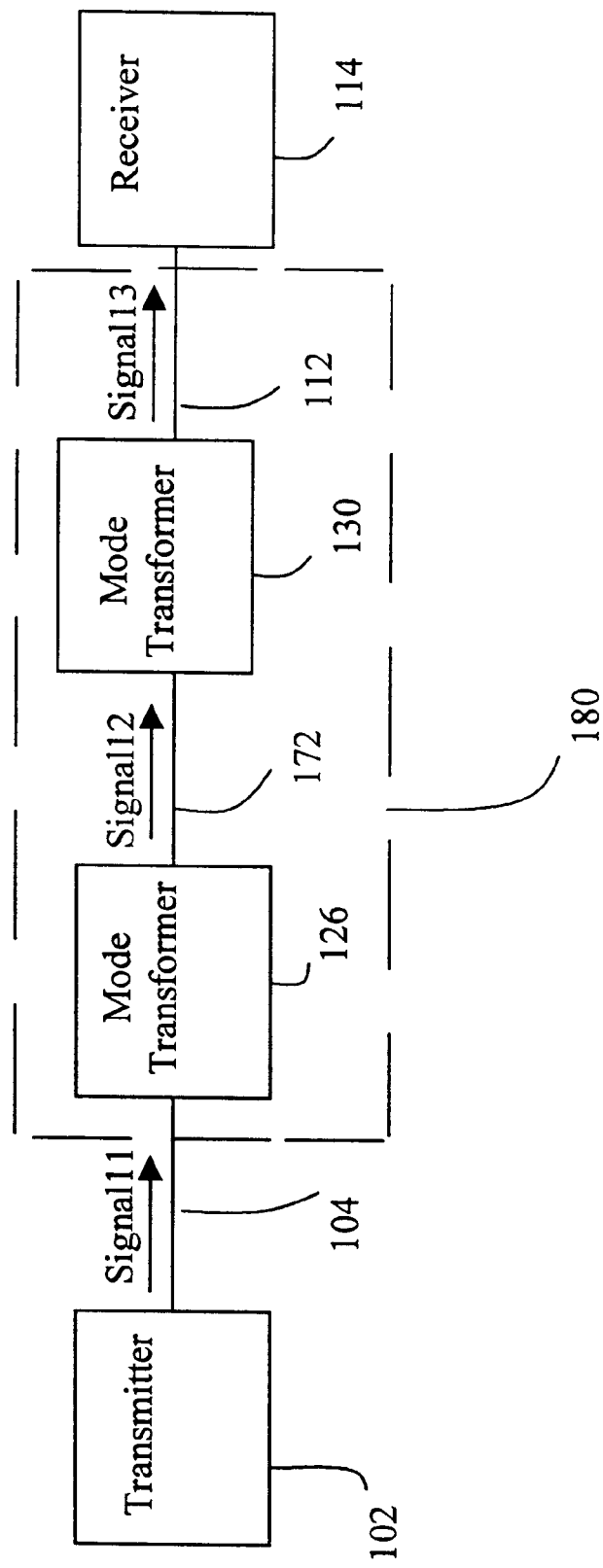
FIG. 15 illustrates a block diagram of another embodiment of a transmission system utilizing a dispersion-compensating device constructed according to the present invention.

FIG. 15 illustrates a system 160 which utilizes an inventive fiber of FIG. 9 to achieve a substantially dispersion free transmission system. Transmitter 102 is coupled to SMF 104, and SMF 104 is coupled to an input of spatial mode transformer 126. An output of spatial mode transformer 126 is coupled to THOM 172, and THOM 172 is coupled to the input of spatial mode transformer 130. An output of spatial mode transformer 130 is connected to SMF 112, and SMF 112 is connected to receiver 114. Transmitter 102 injects a signal, designated as Signal11 a short length of SMF 104 over which no substantial dispersion occurs, and which is connected to spatial mode transformer 126. In an alternative embodiment (not shown), transmitter 102 may be directly connected to spatial mode transformer 126. In another alternative embodiment (not shown), transmitter 102 may be designed to output its signal directly in the desired high order spatial mode, and thus transmitter 102 may be directly connected to THOM 172. THOM 172 is designed according the principles explained above, and its profile is similar to that shown in FIG. 9, with a dispersion of −2.6 ps/nm·km and a dispersion slope of −0.07 ps/nm$^2$·km. THOM 172 transmits the output of spatial mode transformer 126, designated Signal12 which is substantially in the high order spatial mode. THOM 172 is connected to spatial mode converter 130, which converts Signal12 from the high order spatial mode to the fundamental $LP_{01}$ spatial mode prior to outputting the signal as Signal13 to SMF 112. SMF 112 is designed to counterbalance the dispersion and dispersion slope of the signal encountered over THOM 172, prior to the arrival of Signal13 at receiver 114. Thus Signal13 is received with substantially zero chromatic dispersion, yet having experienced large local dispersion in each section of its travel. It will be appreciated by those skilled in the art that a fiber with dispersion 2.6 ps/nm·km and a dispersion slope of 0.07 ps/nm$^2$·km is commercially available. Dashed line 180 indicates the repeating block that may be utilized to build a larger and more complex system, where the end of SMF 112 may be connected to another repeating block at input to spatial mode transformer 126.

In a specific embodiment of system 160, THOM 172 may contain a 50 kilometer span of THOM, which has a characteristic dispersion of −2.6 ps/nm·km, and slope of −0.07 ps/nm$^2$km. SMF 112 may contain a 50 kilometer length of standard SMF such as LEAF™ by Corning Incorporated, Corning, N.Y., with dispersion of 2.6 ps/nm·km, and a slope of 0.07 ps/nm$^2$·km. In an alternative embodiment (not shown) several lengths of THOM may be designed, such that the sum of the dispersion and slope experienced by a signal may be compensated by a single SMF span.

Figure 16:
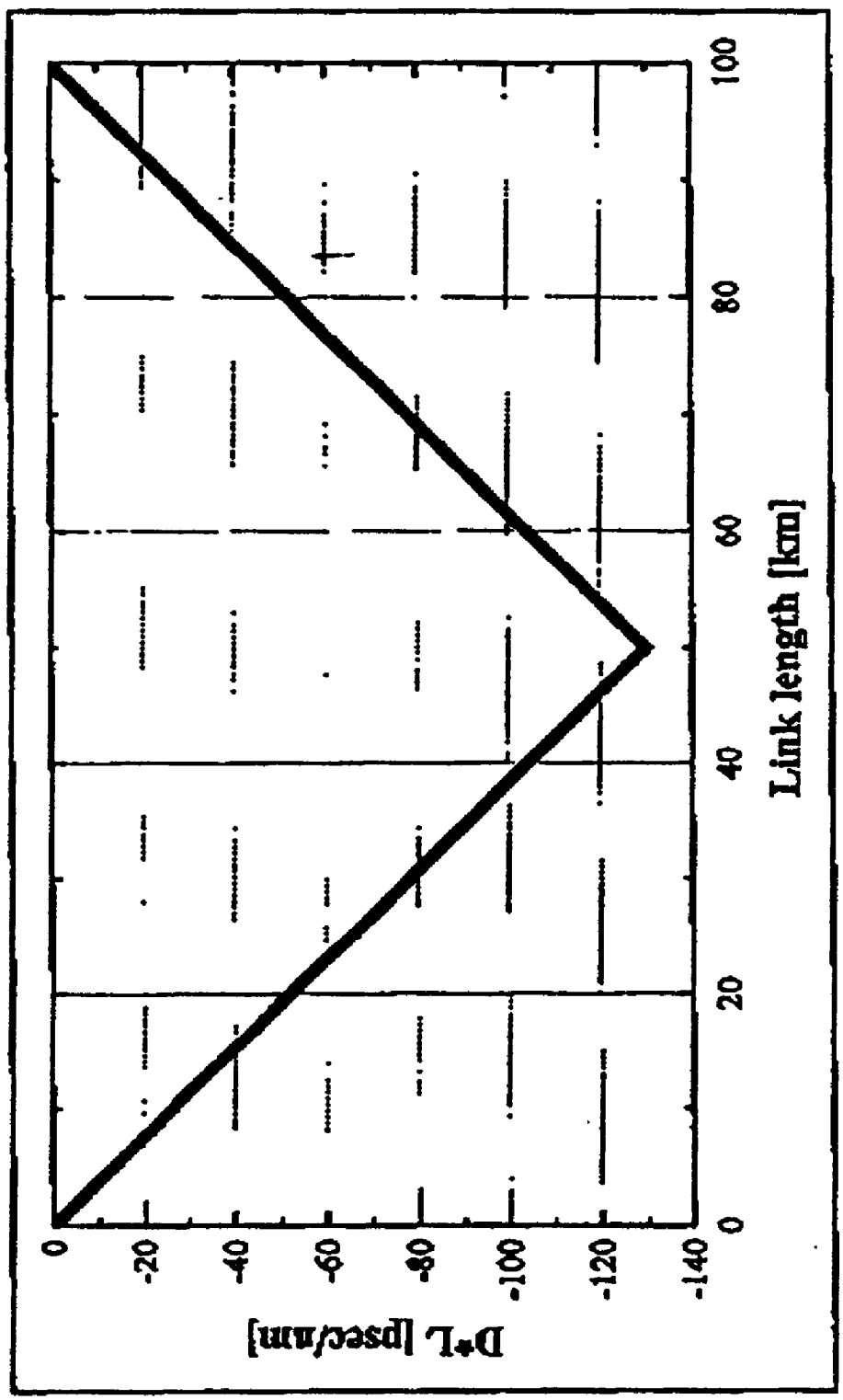
FIG. 16 illustrates the resultant effective dispersion in ps/nm over the length of an example transmission system constructed according to the present invention.

FIG. 16 illustrates the resultant effective dispersion in ps/nm over the length of the system 160 from transformer 126 to receiver 114. The negative dispersion and slope introduced by THOM 128 and THOM 172 is exactly compensated by SMF 112. In addition, spatial mode transformers 126 and 130 may contain amplifiers or other components not shown.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. An optical transmission system for transmitting an optical signal having optical energy over significant transmission distances, said system comprising:

at least one transmission span comprising an optical transmission fiber, said optical transmission fiber being a high order mode fiber having a predetermined profile having predetermined transmission characteristics comprising dispersion whose absolute value is less than 20 ps/nm/km for an optical signal in a single high order mode, whereby said optical signal is transmitted between disparate locations substantially in said single high order mode.

2. The optical transmission system of claim 1 wherein said single high order spatial mode is the $LP_{02}$ spatial mode.

3. The optical transmission system of claim 1 further comprising at least one additional transmission span, wherein said optical energy is in a fundamental spatial mode.

4. The optical transmission system of claim 1, wherein said dispersion of said optical transmission fiber is negative over a given transmission bandwidth.

5. The optical transmission system of claim 1, wherein said dispersion of said optical transmission fiber is positive over a given transmission bandwidth.

6. The optical transmission system of claim 4, wherein the dispersion slope of said optical transmission fiber is nominally zero over said given transmission bandwidth.

7. The optical transmission system of claim 4, wherein the dispersion slope of said optical transmission fiber is positive over said given transmission bandwidth.

8. The optical transmission system of claim 4, wherein the dispersion slope of said optical transmission fiber is negative over said given transmission bandwidth.

9. The optical transmission system of claim 5, wherein the dispersion slope of said optical transmission fiber is nominally zero over said given transmission bandwidth.

10. The optical transmission system of claim 5, wherein the dispersion slope of said optical transmission fiber is positive over said given transmission bandwidth.

11. The optical transmission system of claim 5, wherein the dispersion slope of said optical transmission fiber is negative over said given transmission bandwidth.

12. An optical transmission system for transmitting an optical signal having optical energy over significant transmission distances, said system comprising:

a spatial mode transformer positioned to receive said optical signal, wherein said spatial mode transformer transforms said optical signal having optical energy in a low order spatial mode to an optical signal having optical energy in a high order spatial mode; and at least one transmission span comprising an optical transmission fiber in optical communication with said spatial transformer, said optical transmission fiber being a high order mode fiber having a predetermined profile having predetermined transmission characteristics comprising dispersion whose absolute value is less than 20 ps/nm/km for an optical signal in said single high order mode, whereby said optical signal is transmitted between disparate locations substantially in said single high order mode.

13. The optical transmission system of claim 12, wherein said low order spatial mode is the fundamental spatial mode.

14. The optical transmission system of claim 12, wherein said high order spatial mode is the $LP_{02}$ spatial mode.

15. The optical transmission system of claim 12 further comprising a second spatial mode transformer in optical communication with said optical transmission fiber, wherein said second spatial mode transformer transforms said optical signal having optical energy in said high order spatial mode to an optical signal having optical energy in said low order spatial mode.

16. A method for transmitting an optical signal having optical energy over significant transmission distances substantially in a single high order mode comprising the steps of:

providing at least one transmission span comprising an optical transmission fiber, said optical transmission fiber being a high order mode fiber having a predetermined profile having predetermined transmission characteristics comprising dispersion whose absolute value is less than 20 ps/nm/km for an optical signal in a single high order mode, receiving an optical signal having optical energy in said single high order mode; and transmitting said optical signal having optical energy in said single high order spatial mode through said transmission span, whereby said optical signal is transmitted between disparate locations substantially in said single high order mode.

17. The method of claim 16 wherein said single high order spatial mode is the $LP_{02}$ spatial mode.

18. A method for transmitting an optical signal having optical energy in a first spatial mode over significant transmission distances substantially in a second single high order mode comprising the steps of:

providing at least one transmission span comprising an optical transmission fiber, said optical transmission fiber being a high order mode fiber having a predetermined profile having predetermined transmission characteristics comprising dispersion whose absolute value is less than 20 ps/nm/km for an optical signal in a single high order mode, receiving the optical signal having optical energy in a first spatial mode;

substantially transforming said optical signal having optical energy in said first spatial mode to an optical signal having optical energy in a second spatial mode, said second spatial mode being said single high order mode;

transmitting said optical signal having optical energy in said single high order spatial mode through said transmission span, whereby said optical signal is transmitted between disparate locations substantially in said single high order mode.

19. The method of claim 18 further comprising the step of:

substantially transforming said optical signal having optical energy in said second spatial mode to an optical signal having optical energy in a third spatial mode.

20. The method of claim 18 wherein said first spatial mode is the $LP_{01}$ spatial mode.

21. The method of claim 18 wherein said second spatial mode is the $LP_{02}$ spatial mode.

22. The method of claim 19 wherein said third spatial mode is the $LP_{01}$ spatial mode.

* * * * *